April 19, 1966 R. CALABRESE 3,246,925
AUXILIARY GLARE SHIELD FOR SUN VISORS
Filed Dec. 10, 1963
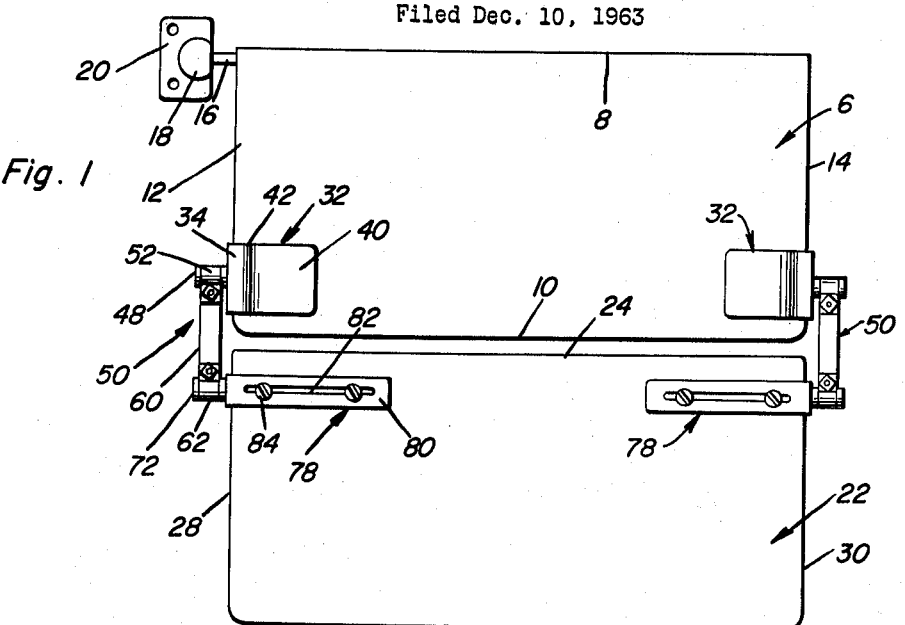
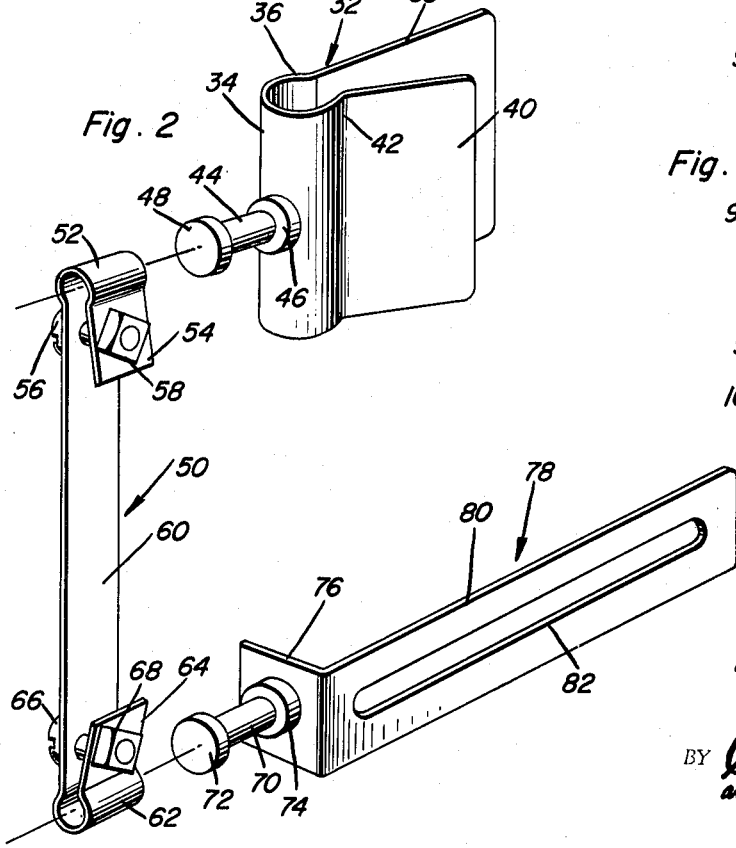
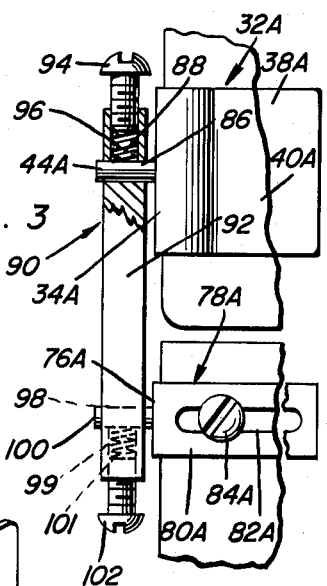
Rocco Calabrese
INVENTOR.

United States Patent Office 3,246,925
Patented Apr. 19, 1966

3,246,925
AUXILIARY GLARE SHIELD FOR SUN VISORS
Rocco Calabrese, 34 W. Somerset Ave., Raritan, N.J.
Filed Dec. 10, 1963, Ser. No. 329,458
5 Claims. (Cl. 296—97)

The present invention relates to an anti-glare shield which is appropriate in size, shape and material for co-operation with a conventional non-transparent sun visor of a type which is in common use on automobiles and equivalent vehicles and relates, more particularly, to the means which is employed to properly mount the anti-glare shield on the sun visor.

It is an object of the present invention to structurally, functionally and in other ways improve upon prior art adaptations wherein a semi-transparent or an equivalent plastic light intercepting, glare-reducing shield is attached to and supported by a conventional-type sun visor. To the ends desired, and to be more specific, the herein revealed invention has to do with a simplified feasible means at the ends of and for orienting and cooperatively connecting the anti-glare shield and sun visor and wherein said means is an improvement on an analogous, but structurally distinct, combination shown in my copending application, Ser. No. 240,646, now Patent No. 3,184,265, dated May 18, 1965.

To be more specific my prior Patent 3,184,265 has to do with an anti-glare panel or shield having opposite transverse ends provided with axially aligned outstanding link-attaching and shield-supporting studs. These studs are constructed to cooperate with similarly, arranged and performing complemental studs on the respective transverse ends of the sun visor. The paired studs at the respective ends of (1) the sun visor and (2) anti-glare shield function to accommodate linking connectors each comprising a pair of complemental links having adjacent ends overlapping and detachably and adjustably joined to each other and wherein outer ends of the respective links are detachably connected with the respective studs provided therefor.

As a result of trial and error and experimentation involving the above invention a different line of approach is herein revealed. To the ends desired at least two adapters are provided, one adapter for each panel (sun visor and anti-glare shield, respectively). These adapters comprise novel brackets having outstanding smooth-surfaced studs which provide connecting and pivoting members for a simplified single link or connector spanning the space between and operatively joined to said studs.

In carrying out the present invention one connecting link comprises a bar member with bearing holes at the ends thereof for reception of the studs provided therefor. These ends are also provided with setscrews which serve to assemble and properly interconnect the cooperating parts.

Novelty is also predicated on an alternate embodiment characterized by a spring clip for either one or both ends of the sun visor and a companion slotted bracket for oriented attachment to the anti-glare shield wherein said clip and bracket, respectively, have headed studs for detachable and adjustable cooperation with intended end portions of the intervening link-type connector.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a view showing, in elevation, a conventional-type sun visor, suitable anti-glare shield and the improved means for assembling and operatively connecting corresponding transverse ends thereof in cooperative relationship;

FIGURE 2 is an exploded perspective view showing a single sun visor clip, complemental anti-glare shield bracket and the assembling and connecting link; and FIGURE 3 is a view based on the structure illustrated at the left in FIG. 1 with the parts on an enlarged scale and broken away and also with one of the parts illustrated in section at an end thereof, this constituting a modified embodiment of the overall concept.

Referring to FIG. 1 the sun visor denoted by the numeral 6 is of conventional form and includes an upper longitudinal hinged edge 8, a longitudinal lower edge 10 and transverse ends 12 and 14. The upper corner of the edges 8 and 12 is provided with appropriate rod or shaft means 16 having ball and socket connection at 18 with the stationary sun visor bracket 20. The semi-transparent or equivalent anti-glare shield 22 is of common rectangular form and of suitable plastic material and may be described as having an upper longitudinal marginal edge 24, a lower marginal edge 26 and transverse marginal edges 28 and 30.

In carrying out the principles of the present invention at least two adapters, broadly speaking, are provided, one for the sun visor 6 and the other one for the anti-glare shield 22. The sun visor adapter comprises a metal or an equivalent clip denoted generally at 32 and having a vertically elongated spring 34 the forward or outer component 36 of which is provided with a generally flat plate-like jaw 38 opposed in spaced relation to the companion jaw or grip 40, the latter being disposed at an oblique angle and having junctional connection at 42 with the spring portion 34. The inherent spring properties of the spring 34 serve to subject the respective jaws 38 and 40 to the intended visor gripping action required to retain the clip 32 securely on the visor once it is fitted thereon in the manner illustrated at the left in FIG. 1.

The median convex portion of the spring 34 is provided with an outstanding attaching and hinging stud 44 which is cylindrical in cross-section and has one end rigidly attached as at 46 to the spring 34. The other end is provided with an enlarged disk-like assembling and retaining head 48. This headed stud serves to accommodate a spring-loaded grip at the upper end of the shield and visor connector or link 50. This means comprises a spring metal split sleeve 52 at the upper end of the link provided with a yieldable free end or tongue portion 54 which is retained in its intended position by way of a bolt 56 passing through suitable bolt holes and provided with an assembling and retaining nut 58.

A correspondingly constructed split sleeve grip or clamp is provided at the bottom of the strap portion 60 of the link, the same being denoted at 62 and being provided with a terminal tongue 64 retained in its intended position by way of the associated bolt 66 passing through bolt holes and retained by the assembling nut 68. This particular clamp 62 is connectible with the stud 70 whose headed end 72 projects laterally from the reinforcing hub 74 provided on the exterior side of the short arm or limb 76 of the L-shaped adapter bracket 78. This bracket comprises a long limb or leg 80 having a slot 82 therein to accommodate the attaching and adjusting screws or equivalent screw-threaded headed fasteners 84.

Taking up now the modification appearing at the right in FIG. 3 a comparison will show that the construction and arrangement of component parts is basically the same as has already been described. Take for example the visor gripping clip. This is in the form of a readily attachable and detachable clip and as a matter of fact this clip 32A corresponds in construction to the clip 32.

Accordingly, it comprises a split tubular vertically disposed sheet material spring 34A which is interposed between and connects the opposed companion gripping jaws 38A and 40A corresponding to the jaws 38 and 40. The stud or journal in this embodiment of the invention is designated at 44A and integrally connected at one end to the rounded bight portion of the spring 34A and projects at right angles therefrom. The stud in this instance is smooth-surfaced and headless (compared to the aforementioned head 48). This stud is journaled in a bearing hole provided therefor at 86 and which is disposed at right angles to the screw-threaded socket 88 which is formed axially in the end portion of the connector 90. This connector comprises a rigid bar or link having the features described. The socket 88 serves to accommodate the screw-threaded shank of a spring tensioning setscrew 94 which is screwed into the socket and has end thrust engagement with a coil spring 96 which is confined in the socket and which has an end thereof directly contacting and bearing against the peripheral surface of the stud 44A. The lower end portion of the connector link or bar 92 is also provided with a right angularly disposed bearing hole 98 which is arranged to accommodate the stud or journal 100 in the manner illustrated in dotted lines. The construction here is the same as at the upper end in that the axial socket 99 is provided with and encloses a coil spring 101 against which the screw-threaded shank of the spring tensioning and adjusting setscrew 102 bears thus and with this arrangement there are upper and lower spring adjusting setscrews 94 and 102 screwed into their respective sockets and serving to retain the coil springs in place and also to press the coil spring against the surface of the stud to regulate proper strength of adjustment for swinging the anti-glare shield up or down to the position needed. Also in this form of the invention an L-shaped adapter bracket is provided and is denoted generally by the numeral 78A. This bracket is the same in construction as the bracket 78 in that it embodies corresponding parts 76A, 80A, 82A and 84A, and obviously functions in the manner already described.

Experience has shown that by applying the adapters (clips 32 and 32A and brackets 78 and 78A) on the transverse adjacent corner portions of the visor and shield 6 and 22, these parts are cooperatively linked in a manner permitting the same to be used singly and collectively. This is to say, the shield and sun visor can be folded into close proximity for compactness and convenience when not being used or they can be swung down to the substantially vertical position illustrated in FIG. 1 wherein they conjointly serve the needs of the driver, conditioned on whether the driver is called upon to cope with glaring sun rays, reflected highway lights or with headlights from oncoming cars, as the case may be. As is reasonably clear from the preceding disclosure (including my prior Patent 3,184,265) the link-connected properly paired adapter brackets (FIGS. 1 and 3) are capable of use at the respective transverse ends to facilitate coplanar aligned usage or wholly or partly folded usage as shown in FIG. 1 of my prior patent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Attachment means for mounting an anti-glare shield on a sun visor comprising a first adapter embodying a springy clip having gripping jaws for attachment to and retention on cooperating sides of the sun visor, said clip being provided with outstanding smooth-surfaced assembling and retaining stud and said stud terminating in an enlarged head, a second adapter comprising an L-shaped bracket having a long limb and a short limb, said long limb being provided with an elongated slot, said short limb being provided with an outstanding smooth-surfaced headed stud, the respective studs being disposed in spaced parallel relation, a linking strap, and split-sleeve assembling grips at the respective ends of said strap, said grips being removably and adjustably bolted on their respectively cooperating studs.

2. In combination, a conventional-type non-transparent sun visor, a complemental semi-transparent anti-glare shield, and means orienting and cooperatively mounting at least one end portion of said anti-glare shield on a coordinating transverse end portion of said sun visor, said means characterized by a first adapter detachably and adjustably connected to the end portion of said sun visor with which it is associatively cooperable, said adapter comprising a spring clip having yieldable jaws gripping portions of said sun visor therebetween, said clip having an end projecting beyond a cooperating marginal edge of said sun visor and provided with a rigid outstanding smooth-surfaced assembling and retaining stud, a second adapter comprising an elongated L-shaped bracket having a slotted long limb superimposed upon and adjustably fastened to a cooperating surface of said anti-glare shield and having a laterally directed short limb at an outer end of the long limb, said short limb being provided with an outstanding smooth surfaced stud, the studs on said adapters being disposed in spaced parallel coplanar relationship, and a single assembling member interposed between the respective studs and adapters and in a common plane therewith and having its respective end portions pivotally and adjustably connected to the respectively cooperating studs and linking the adapters, sun visor and anti-glare shield in cooperative relationship.

3. The structure defined in claim 2 and wherein corresponding transverse marginal edges of said sun visor and shield are cooperatively aligned with each other, said clip embodying a generally planar jaw firmly contacting an exterior surface of the sun visor, a second jaw complemental to said planar jaw, said second jaw being disposed at an oblique angle whereby it flares slightly away from an adjacent cooperating surface of the sun visor, the corresponding outer ends of said jaws being joined by a split inherently resilient retention sleeve and said sleeve being provided with and supporting the first-named stud, said studs being provided at their outer terminal ends with enlarged assembling and retaining heads.

4. In combination, an anti-glare shield adapted to be detachably and adjustably mounted on a conventional-type sun visor, and means for mounting and attaching said anti-glare shield to a cooperating end portion of said sun visor, said means comprising an adapter clip having spring-biased gripping jaws in opposed cooperating relationship and adapted to grip said sun visor between themselves, said clip having an outstanding smooth-surfaced stud, an L-shaped bracket complemental to said clip and embodying a long arm and a relatively short arm at one end of the long arm, said long arm being superimposed on a coacting surface of said anti-glare shield and being provided with means detachably and adjustably mounting said long arm on said anti-glare shield, said short arm being disposed at right angles to an adjacent marginal edge of said anti-glare shield and being provided with an outstanding stud, the respective studs being disposed in spaced parallel coacting relationship to each other, and a linking bar provided with stud openings adjacent its respective ends, said studs extending through said openings, and setscrews mounted axially in the respective end portions of said bar with the setscrews designed and adapted to cooperate with the studs.

5. In combination, an anti-glare shield adapted to be detachably and adjustably mounted on a conventional-type sun visor, and means for mounting and attaching said anti-glare shield to a cooperating end portion of said sun visor, said means comprising an adapter clip having spring-biased gripping jaws in opposed cooperating relationship and adapted to grip said sun visor between themselves, said clip having an outstanding smooth surfaced stud, an L-shaped bracket complemental to said clip and embodying a long arm and a relatively short arm at one end of the long arm, said long arm being superimposed on a coacting surface of said anti-glare shield and being provided with means detachably and adjustably mounting said long arm on said anti-glare shield, said short arm being disposed at right angles to an adjacent marginal edge of said anti-glare shield and being provided with an outstanding stud, the respective studs being disposed in spaced parallel coacting relationship to each other, and a rigid linking bar for said studs having right angularly disposed longitudinally spaced bores extending therethrough and providing bearings, said studs providing journals and being journaled in their respective bearings, the upper and lower ends of said bar outwardly of the respective bearings being provided with axially disposed sockets having open outer ends exposing coacting surfaces of the respective studs, a coil spring confined in each socket, the walls of the socket being screw-threaded, and a setscrew having a screw-threaded shank screwed into its socket and engaging and having end thrust cooperation with the coil spring.

References Cited by the Examiner

UNITED STATES PATENTS

| | | |
|---|---|---|
| 892,612 | 7/1908 | O'Neill. |
| 959,099 | 5/1910 | Anderson _____ 88—99 X |
| 1,958,962 | 5/1934 | Crosby _____ 296—97 |
| 2,261,881 | 11/1941 | Horstmann _____ 296—97 |
| 2,542,409 | 2/1951 | Guenther _____ 248—284 X |
| 2,921,813 | 1/1960 | Lowry _____ 296—97 |

BENJAMIN HERSH, *Primary Examiner.*